United States Patent [19]

Tseng et al.

[11] Patent Number: 5,793,482
[45] Date of Patent: Aug. 11, 1998

[54] MULTIPLE OPTICAL LENS SYSTEM WITH AUTO-FOCUS CALIBRATION

[75] Inventors: Wen-Tso Tseng, Taichung; Henry Peng; Kevin Yang, both of Hsinchu, all of Taiwan

[73] Assignee: Umax Data Systems Inc., Taiwan

[21] Appl. No.: 796,390

[22] Filed: Feb. 4, 1997

[51] Int. Cl.$^6$ .................................................. G01B 9/00
[52] U.S. Cl. .................. 356/124; 250/201.4; 356/124.5; 356/125
[58] Field of Search ................... 356/124, 124.5, 356/125; 250/201.4

[56] References Cited

U.S. PATENT DOCUMENTS

| | | | |
|---|---|---|---|
| 4,099,877 | 7/1978 | Brouwer | 356/124 |
| 4,281,926 | 8/1981 | Cornsweet | 356/124 |
| 4,282,548 | 8/1981 | Plummer | 356/125 |
| 5,017,005 | 5/1991 | Shindo | 356/125 |
| 5,257,125 | 10/1993 | Maeda | 250/201.4 |
| 5,276,318 | 1/1994 | Hirasawa | 250/201.4 |

FOREIGN PATENT DOCUMENTS

624783 A2  5/1994  Japan .................................. 356/124

*Primary Examiner*—Frank G. Font
*Assistant Examiner*—Zandra V. Smith
*Attorney, Agent, or Firm*—Sughrue, Mion, Zinn, Macpeak & Seas, PLLC

[57] ABSTRACT

The present invention discloses an optical system with multiple optical lens having capability of auto-focus calibration, instead of conventional scheme of manual operations. Furthermore, achieve purpose of obtaining more accuracy in sharpness and magnification calibration than the conventionally scheme, and of upgrading yield rate of the system. The optical system disclosed by the invention basically includes a lot of home-sensors and micro-sensors, lots of lens, an image sensor, an imaging control motor, a lens switch motor for switching the lens, and a base control motor for switching base of the optical system. By using the imaging control motor and the base control motor to control motions of the imaging device and the lens, auto sharpness and magnification calibration is easily achieved.

23 Claims, 3 Drawing Sheets

MULTIPLE OPTICAL LENS SYSTEM WITH AUTO-FOCUS CALIBRATION

BACKGROUND OF THE INVENTION

1. Field of the Invention

The present invention relates to a system with multiple optical lens, and more particularly to a system with capability of auto-focus calibration including sharpness and magnification adjustment, furthermore, to achieve the purpose of obtaining more accuracy in focus adjusting than conventionally manual operations, and upgrading yield rate of the system with multiple lens.

2. Description of the Prior Art

As science goes on getting progress, many kinds of products are produced and modified each day. A similar progress also occurs in optical systems such as scanners. A requirement of higher resolution than ever has brought about an optical system with multiple lens. Unfortunately, even finer optical instruments still have some manufacture errors, such as focal length of lens can not exactly fit with its theoretical focal length, or summation of kinds' manufacture errors after assembly. In order to upgrade accuracy and yield rate of the optical systems, some adjustments are required for calibrating the system.

Conventional scheme for sharpness and magnification calibration of a scanner is achieved by using manual adjusting. Not only the system accuracy depends on the operator's experiments and is out of control, but is inconsistent with the requirement of auto-producing procedures. An improvement to the traditional scheme of adjusting becomes an eager desire for upgrading yield rate with high efficiency.

SUMMARY OF THE INVENTION

The principle object of the present invention is to provide an optical system such as scanner with multiple lens to be capable of automatically calibrating foci of lens inside the system without applying manual adjusting.

The other object of the invention is to provide the optical system being capable of upgrading accuracy and yield rate of the system.

A further object of the invention is to provide the optical system being capable of following auto-producing procedures for achieving high efficiency purpose.

The optical system according to the invention is composed of at least a test chart, a lot of optical lens, micro-sensors, home-sensors, a base control motor, an image sensor, a lens switch motor for switching the optical lens, and an imaging control motor for moving the image sensor.

The optical system according to the invention applies the imaging control motor and the base control motor for controlling movements of the image sensor and the optical lens, respectively, and obtains information derived from the image sensor for sharpness and magnification calibration. This procedure repeats until the optical system passes both the sharpness and magnification calibration criteria.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
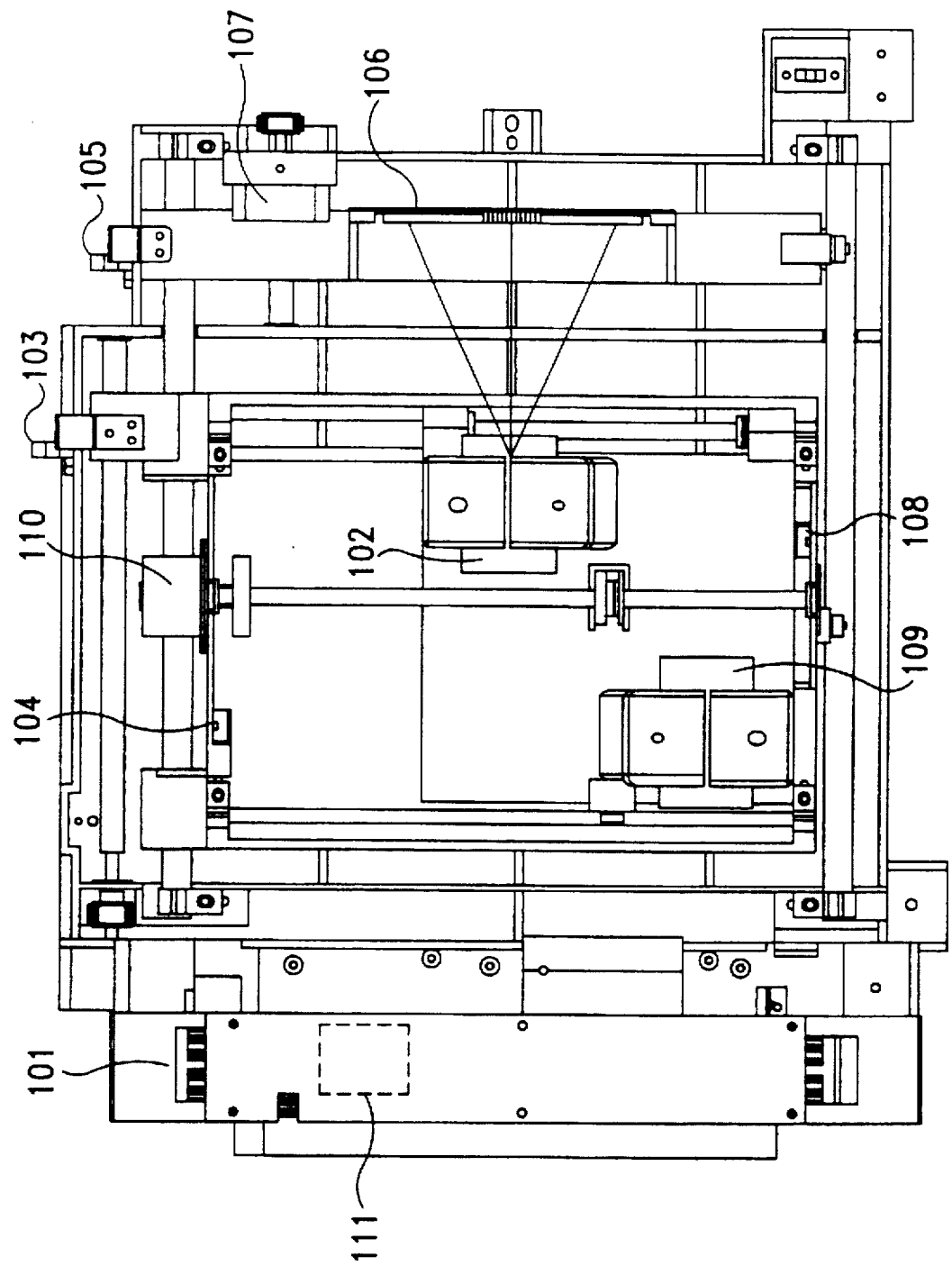
FIG. 1 represents a drawing of an optical system having multiple lens and capability of auto-focus calibration according to the present invention, and a condition of 1220 dpi (Dot-Per-Inch) resolution is calibrating.

FIG. 1 displays a drawing of an optical system having multiple lens and capability of auto calibrating foci of the lens (referring to "auto-focus calibration system" for short). Furthermore, the FIG. 1 also represents a condition of 1220 dpi (Dot-Per-Inch) resolution is calibrating.

According to schematic diagram of the FIG. 1, the auto-focus calibration system is basically composed of a test chart 101, lens 102 and 109, micro-sensors 103 and 105, home-sensors 104 and 108, a charge coupled device (CCD) 106, a CCD control motor 107, a lens switch motor 110 for switching the lens 102 and 109, and a base control motor 111 for moving base of the auto-focus calibration system.

Both of the base of the auto-focus calibration system and the CCD 106 must return to their initial conditions before the auto-focus calibration procedure starts. The home-sensors 103 and 105 detect whether the base and the CCD 106 arrive their initial states, respectively. The lens switch motor 110 switches the lens 102 and 109 based on resolution to make the optical path passes through the test chart 101, the lens 102 or 109 to the CCD 106. Calibration information is then derived from the CCD 106. Based on the calibration information, sharpness and magnification calibration can be achieved by using the base control motor 111 and the CCD control motor 107 for properly moving the base of the auto-focus calibration system and the CCD 106, respectively.

Please note that the base control motor 111 can only move the base of the auto calibration system. Movement of the CCD 106 is under controlled by the CCD control motor 107. In addition, the image sensor is not being constrained to a specific device. For example, the CCD 106 in the preferred embodiment can be replaced by another kind of image sensor such as CIS (Contact Image Sensor) in accordance with proper modification in structure.

Furthermore, the lens 102 and 109 represent different resolution, and being switched by the lens switch motor 110. Information detected by the micro-sensors 103 and 105 is used to notify the auto-focus calibration system which lens is under calibrating. The test chart 101 contains special patterns designed beforehand for adjusting purpose, and forms a clear image with known magnification while a calibrated lens forms an image on its focus exactly.

According to calibration procedure described in the FIG. 1, the lens switch motor 110 switches the lens 102 to center of the auto-focus calibration system to make the optical path pass through the test chart 101, the lens 102 to the CCD 106. Calibration information can be derived from the CCD 106. In the mean time, the of the micro-sensor 108 is off, but the micro-sensor 104 is on. It implies that the lens 102 is under calibrating. After the calibration information is obtained, the base control motor 111 moves the base of the auto-focus calibration system properly for purpose of focus adjustment of the lens 102. The magnification adjustment is achieved via movements of the CCD 106 by using the CCD control motor 107.

Figure 2:
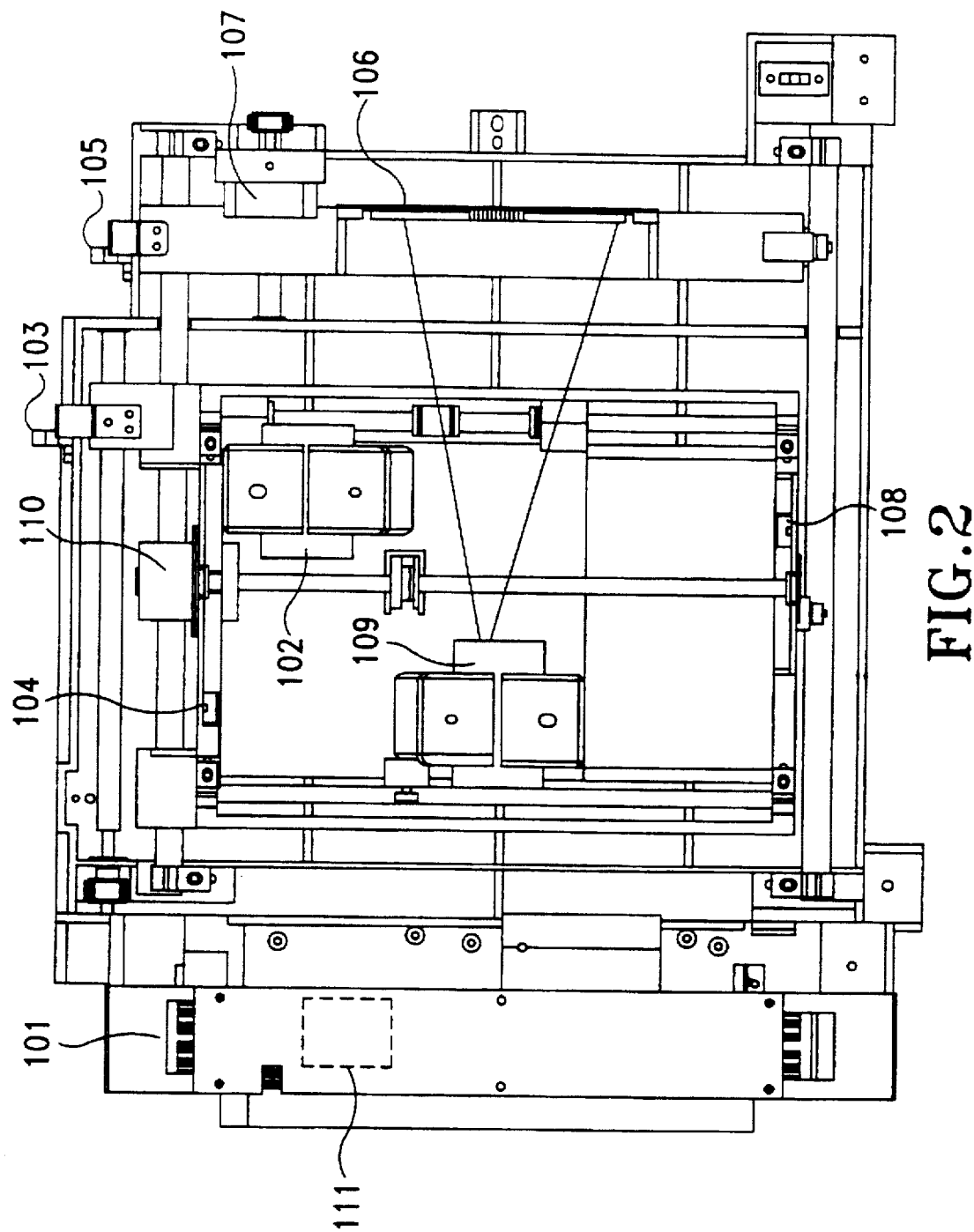
FIG. 2 is a drawing of the optical system that a condition of 3048 dpi resolution is calibrating.

FIG. 2 describes calibration procedure of resolution 3048 dpi. Similarly to the condition of the resolution 1220 dpi the lens switch motor 110 switches the lens 109 to the center of the auto-focus calibration system, and makes the optical path pass through the test chart 101, the lens 102 to the CCD 106. Calibration information is also derived from the CCD 106. In the mean time, the micro-sensor 104 is off, but the micro-sensor 108 is on. It implies that the lens 109 is under calibrating. After the calibration information is obtained, the base control motor 111 moves the base of the auto-focus calibration system properly for purpose of focus adjustment of the lens 102. The magnification adjustment is achieved also via movements of the CCD 106 by using the CCD control motor 107.

Figure 3:
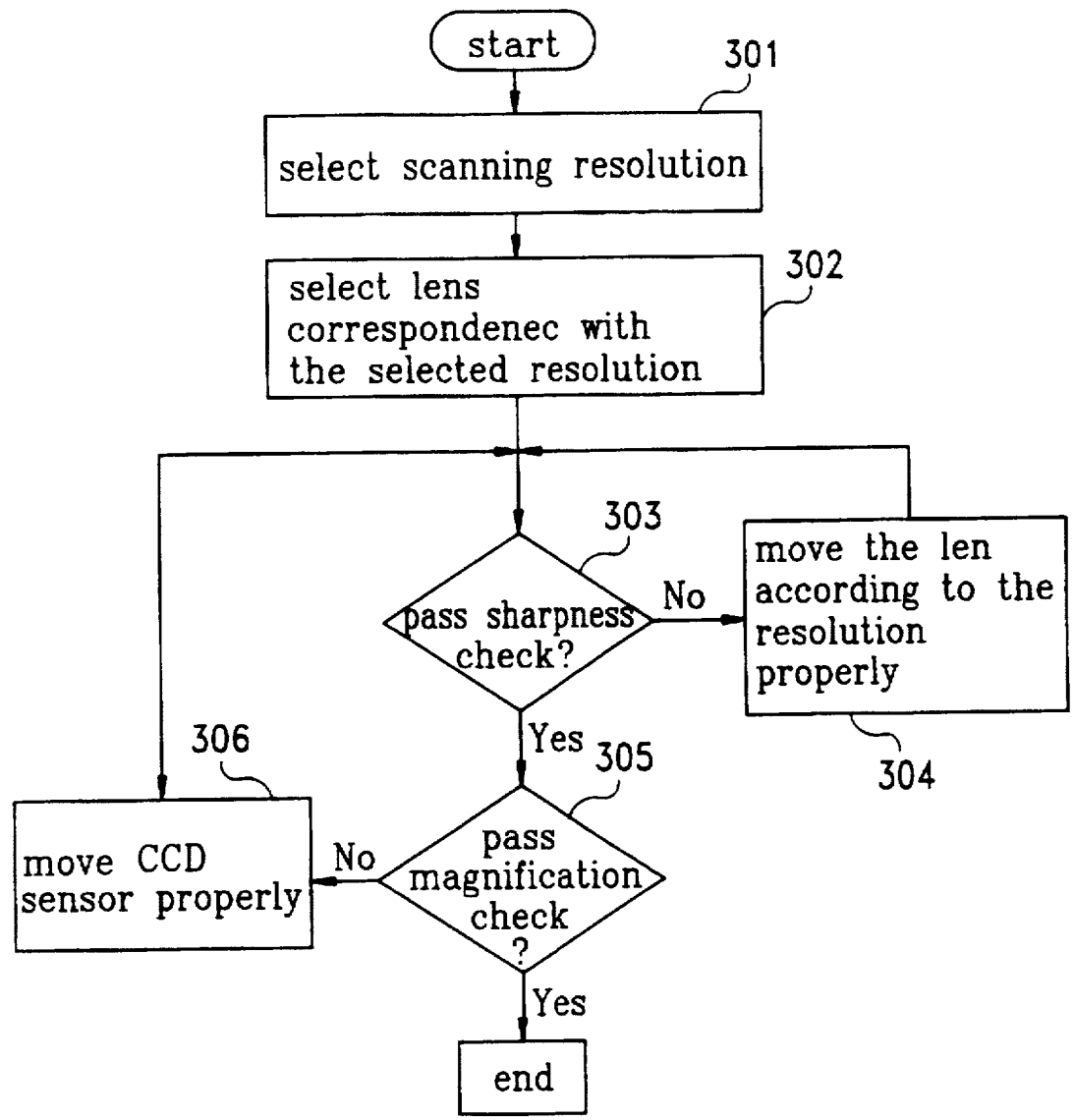
FIG. 3 shows a flow chart for describing operations of auto-focus calibration according to the present invention.

FIG. 3 is a flow chart representing the operations of auto-focus calibrating according to the present invention. After all components of the auto-focus system returns to their initial states, a calibrated resolution must be decided for selecting accordance lens (step 301). The lens switch motor 110 can implement this task of selecting the specified lens. For example, the 1220 dpi resolution applies the lens 102, and resolution of the 3048 dpi applies the lens 109.

Sharpness calibration is performed in step 303. Because each optical instrument has somewhat manufacture error, the calibrated lens can not avoid itself to have no such error. However, an incorrect focus will generate a blurring image. It is important to make the lens for imaging on its focus as exactly as possible. Furthermore, an optical system such as scanner can be seemed as a transferring system for converting plane imaging signals into digital signals. A desire for an image evaluation scheme to estimate the system performance is certainly growing up.

In the preferred embodiment, the scheme for evaluating sharpness quality of the auto-focus calibration system is MTF (Modulation Transfer Function) that applies a test chart with half resolution to the calibrated system. For example, a test chart with 100 lppi resolution is used for a scanner with 400 dpi resolution. After the calibration information is obtain, R (Red), G (Green), B (Blue) channels are analyzing separately for ensuring them can pass a preset criterion of sharpness measurement. In the preferred embodiment, evaluation of the preset criterion is 40%. If the auto-focus calibration system fails in MTF measurement, the base control motor 111 will move the base of the auto-focus calibration system to force the lens 102 or 109 being properly moved until the auto-focus calibration system passes the MTF evaluation (step 304). Please note that the CCD 106 is motionless in the step 304.

Magnification calibration is performed after the sharpness adjusting is completed (step 305). An image generated by the proper focus may be clear but fails in magnification after the sharpness adjusting (it also raises by manufacture error of the optical instrument). That is the reason why the magnification calibration is needed.

Assume theoretical magnification of the lens is known as M*, and current magnification being M. In the preferred embodiment, the deviation of magnification is defined as:

$$I = \frac{|M^* - M|}{M^*}$$

where the |M*−M| represents the absolute value of the difference between M* and M. The deviation of magnification I can not be greater than 0.005 in the preferred embodiment. Furthermore, if value of |M*−M| is smaller, the magnification is closer to the theoretical magnification.

When the detecting magnification fails in the measurement mentioned above, the CCD must be moved for purpose of modifying the current magnification M (step 306). This can be done by using the CCD control motor 107 to move the CCD 106. While the deviation of magnification I is less than the preset criterion 0.005, the auto-focus calibration system goes back to step 303 for sharpness calibration because the sharpness may have been changed. The auto-focus calibration system repeats the above procedure from steps 303 to 306 until the system passes both criteria of the sharpness and magnification calibrations.

In some cases, the calibration procedure described in the FIG. 3 may trap in an infinite loop for some optical system having larger manufacture error. To avoid this, a timer is used for counting the calibration time from the procedure starts. When the calibrating time is over than a preset criterion, the auto-focus calibration system will stop automatically for the optical system fails in the calibration procedure. This also achieves the requirement of auto-testing process.

In conclusion, the present invention discloses an auto-focus calibration system for adjusting sharpness and magnification in an optical system having multiple lens. Not only the purpose of modern auto-producing procedure is achieved, but also increases the yield rate and production effect.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An optical system having multiple lens with auto-focus calibration capability, said system can calibrate sharpness and magnification of said lens in said system, for achieving purpose of automation and upgrading yield rate and economical efficiency, said system comprises:

home-sensing means for notifying whether said system returns to initial condition;

image-forming control means responsive to a resolution designating signal for generating image-forming enabling signals;

testing means for generating testing signals;

a plurality of image-forming devices receives said image-forming enabling signals for activating one of said image-forming devices, remainder of said image-forming devices being keeping idle, and said active image-forming device receives said testing signals for generating imaging-designating signals;

imaging means responsive to said imaging-designating signals for generating calibration information representative of information for said sharpness and said magnification calibration;

a plurality of micro-sensing devices for notifying which said image-forming devices is active;

base controlling means responsive to said calibration information for controlling moving of said image-forming devices; and imaging controlling means responsive to said calibration information for controlling motions of said imaging means.

2. The system according to claim 1, wherein said testing means comprises a test chart.

3. The system according to claim 1, wherein quantity of said image-forming devices is equal to total number of said micro-sensing devices.

4. The system according to claim 1, wherein said image-forming devices comprises a plurality of lens.

5. The system according to claim 1, wherein said imaging means comprises a CCD (Charge Coupled Device).

6. The system according to claim 1, wherein said imaging means comprises a CIS (Contact Image Sensor).

7. An optical system having multiple lens with auto-focus calibration capability, said system can calibrate sharpness and magnification of said lens in said system, for achieving purpose of automation and upgrading yield rate and economical efficiency, said system comprises:

testing means for generating testing signals;

image-forming controlling means responsive to a resolution designating signal for generating image-forming enabling signals to designate an activating image-forming device;

first image-forming device responsive to said image-forming enabling signals for deciding whether said first image-forming device is activated, when said first image-forming device is active, said first image-forming device responsive to said testing signals for generating first imaging-designating signals;

second image-forming devices responsive to said image-forming enabling signals for deciding whether said second image-forming device is activated, when said second image-forming device is active, said second image-forming device responsive to said testing signals for generating second imaging-designating signals;

imaging means responsive to said first imaging-designating signals for generating first sensing information representative of information for said sharpness and said magnification calibration when said first image-forming device is active, and responsive to said second imaging-designating signals for generating second sensing information representative of information for said sharpness and said magnification calibration when said second image-forming device is active;

first micro-sensing means for notifying whether said first image-forming device is active;

second micro-sensing means for notifying whether said second image-forming device is active;

base controlling means responsive to said first sensing information for controlling moving of said first image-forming device when said first image-forming device is active, and responsive to said second sensing information for controlling moving of said second image-forming device when said second image-forming device is active;

imaging controlling means responsive to said first sensing information for controlling motion of said imaging means when said first image-forming device is active, and responsive to said second sensing information for controlling motion of said imaging means when said second image-forming device is active;

base home-sensing means for notifying whether base of said system returns to initial condition of said base; and imaging home-sensing means for notifying whether said imaging means returns to initial condition of said imaging means.

8. The system according to claim 7, wherein said testing means comprises a test chart.

9. The system according to claim 7, wherein said first image-forming device comprises a plurality of optical lens.

10. The system according to claim 7, wherein said second image-forming device comprises a plurality of optical lens.

11. The system according to claim 7, wherein said imaging means comprises a CCD (Charge Coupled Device).

12. The system according to claim 7, wherein said imaging means comprises a CIS (Contact Image Sensor).

13. A method for auto sharpness and magnification adjusting in an optical system with multiple lens, said method comprising the steps of:

inputting a resolution information representative of a resolution being calibrated;

selecting lens according to said resolution information;

performing a sharpness calibration procedure for forcing said system to pass sharpness calibration;

performing a magnification calibration procedure for forcing said system to pass magnification calibration; and repeating said performing said sharpness calibration procedure and said performing magnification calibration procedure steps a plurality of times until said system pass both said sharpness calibration and said magnification calibration.

14. The method according to claim 13, wherein said sharpness calibration procedure comprising the steps of:

producing a sharpness adjusting information representative of sharpness calibration measurement of said system;

moving said lens by using said sharpness adjusting information; and repeating said producing and said moving steps a plurality of times until said system passes a preset criterion of sharpness calibrating measurement.

15. The method according to claim 14, wherein said sharpness adjusting information is obtained by using a MTF (Modulation Transfer Function) scheme.

16. The method according to claim 15, wherein said preset criterion of sharpness calibrating measurement is 40%.

17. The method according to claim 13, wherein said magnification calibration procedure comprising the steps of:

detecting current magnification;

comparing theoretical magnification of said lens and said current magnification to obtain a comparing information;

moving image sensors of said system by using comparing information; and repeating said detecting, said comparing, and said moving steps a plurality of times until said system passes a preset criterion of magnification measurement.

18. The method according to claim 17, wherein said comparing information is obtained by the steps of:

calculating a difference between said theoretical magnification and said current magnification;

calculating an absolute value of said difference;

calculating a quotient of said absolute value dividing said theoretical magnification; and outputting said quotient being said comparing information.

19. The method according to claim 18, wherein said preset criterion of magnification measurement is 0.005.

20. The method according to claim 17, wherein said image sensors comprises a CCD (Charge Coupled Device).

21. The system according to claim 17, wherein said image sensors comprises a CIS (Contact Image Sensor).

22. The method according to claim 13, said step of repeating said detecting, said comparing, and said moving steps a plurality of times further comprising a step of counting all calibration time, when said calibration time is over than a preset criterion, said method of auto sharpness and magnification adjusting stops automatically for said optical system fails to pass said sharpness and magnification calibration.

23. The method according to claim 13, said step of said inputting said resolution information representative of said resolution being calibrated further comprising a step of making said optical system return to initial condition of said optical system.

* * * * *